June 19, 1956 C. C. CHELF Re. 24,167

AUXILIARY TOOL SUPPORT

Original Filed June 10, 1953

INVENTOR.
CLARENCE C. CHELF
BY
Leech & Radue
ATTORNEYS

United States Patent Office

Re. 24,167

Reissued June 19, 1956

24,167

AUXILIARY TOOL SUPPORT

Clarence C. Chelf, Lebanon, Ky.

Original No. 2,714,830, dated August 9, 1955, Serial No. 360,764, June 10, 1953. Application for reissue March 27, 1956, Serial No. 574,352

4 Claims. (Cl. 82—37)

Matter enclosed in heavy brackets [ ] appears in the original patent but forms no part of this reissue specification; matter printed in italics indicates the additions made by reissue.

This invention relates to an improved auxiliary tool support for use on conventional forms of lathes, and particularly useful in furnishing additional support for the cantilevered outer end of a cutting tool used in working on large diameter stock.

The primary object of this invention is to provide an auxiliary support for a cutting tool which will aid in supporting and steadying the outer end of this tool to prevent chattering.

It is a further object to provide such an auxiliary tool support which will be adjustable so as to be generally adapted for use on all ordinary lathes.

A still further object is the provision of an auxiliary tool support having a base which is knurled or otherwise provided with means for preventing slippage of the base when positioned on a lathe carriage or cross feed member.

Additional objects and advantages will become apparent from the following description and drawings, wherein.

Figure 1:
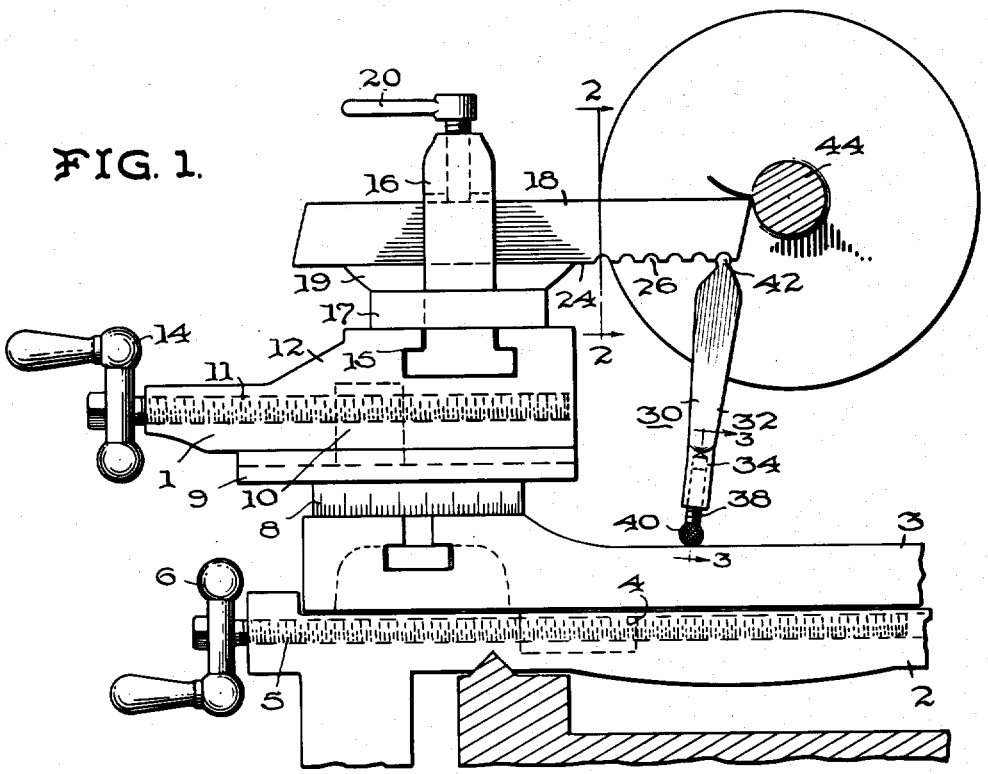
Fig. 1 is an end elevation of a lathe carriage and associated parts showing the manner in which the auxiliary device is positioned to aid in supporting the cutting tool during a parting operation.

The portions of the lathe necessary to an understanding of the use of the auxiliary support are shown in Fig. 1 wherein a longitudinally movable carriage 2 slidably supports a cross feed member 3 having a depending flange 4 which moves in a transverse channel in the carriage under the action of screw member 5 extending across the channel. Screw 5 is rotated by hand wheel 6 to move the cross feed member 3 transversely across the carriage. A compound 7 having a graduated or scaled swivel base 8 is mounted on the cross feed member 3 by suitable means. The swivel base 8 carries a slide rest 9 having an upstanding lug 10 which is engaged by screw 11 carried in a channel in slide 12. Screw 11 is rotated by hand wheel 14 to cause the slide 12 to travel back and forth on the slide rest 9. The slide 12 has a keyway 15 in its upper portion adapted to receive the lower section of tool post 16. A circular washer 17 having a concave inner surface is placed down over the tool post 16 and rests on the upper surface of the slide 12.

The upper portion of the tool post 16 is slotted in the usual manner to receive a cutting tool 18 and rocker 19 which cooperates with clamping screw 20 to secure tool 18 in position, adjustable in height and projection.

Cutting tool 18 is generally rectangular in cross-section and its lower edge 24 is provided with a series of longitudinally spaced transverse channels, notches, sockets or grooves 26. In cross-section these grooves are generally curved to approximate a semi-circle and cooperate with a complementary shaped portion on the upper end of the tool support.

Figure 3:
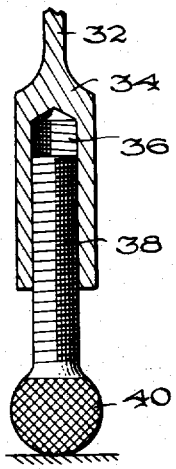
Fig. 3 is a longitudinal section through the auxiliary support taken along line 3—3 of Fig. 1 and showing the enlarged bottom portion of the support body and the base which is adjustably mounted thereon.

The tool support 30 comprises a wide, flat body portion 32 tapering and blending into a generally enlarged lower section 34. As shown in Fig. 3 this section 34 has a threaded longitudinal bore 36 which receives threaded shaft 38 terminating in rounded head 40. Shaft 38 and head 40 make up the adjustable auxiliary tool support base. The width of the upper portion of the flat body 32 converges upwardly to form a tooth-like element 42 generally semi-circular in shape extending across the thickness of the support and adapted to cooperate selectively with one of the grooves 26 in the lower face of the cutting tool.

As shown in Figs. 1 and 3 the head 40 of the support base is knurled or otherwise roughened to produce a better frictional engagement with the upper surface of the cross feed member 3.

Figure 2:
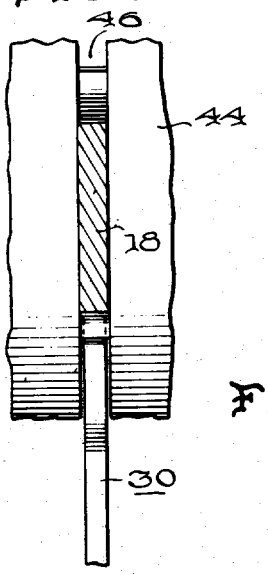
Fig. 2 is a longitudinal vertical section on an enlarged scale taken along line 2—2 of Fig. 1, showing the cutting tool in operation on the stock with the auxiliary support acting upwardly against the lower edge of the tool.

Fig. 2 shows the cutting tool 18 as it cuts into the rotating stock 44 to produce the cut away section 46. The upper portion of tool support 30 is thinner than the cutting tool so that it may follow the latter into the cut out section 46 to continuously support the cutting tool throughout its travel and thereby aid in preventing chattering during the entire parting operation.

Obviously, it is advantageous to mount the tool support near the active end of the cutting tool, as there will be less likelihood of the tool springing and thereby chattering. Because of the desirability of having the tool support mounted near the extremity of the cutting tool it is necessary that the tool support be thinner than the tool. The plurality of grooves 26 provide adjustability and also come into successive use as the tool is ground away, when sharpened.

Figure 4:
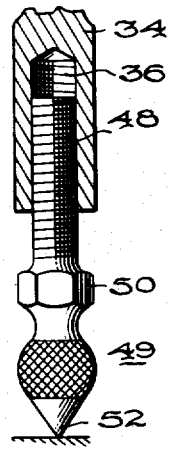
Fig. 4 is a section similar to Fig. 3 showing a modification wherein the base has a pointed head and a hexagonal portion to aid in gripping the same.

A modification of the adjustable tool support base of Fig. 3 is shown in Fig. 4. Herein is shown the same enlarged body section 34 and threaded bore 36 receiving threaded shaft 48 having head 49 on one extremity thereof. This head 49 has a hexagonal section 50 and a pointed end 52. The pointed end makes it possible for the head 49 to somewhat embed itself in the softer metal of the cross feed member 3 to firmly hold the tool support in fixed position. The hexagonal section is useful since a wrench may be applied here to turn the base for purposes of adjusting the overall length of the tool support after installation, when the compound is not set on 0; or when the tool support is used on a turret lathe which has no compound.

Figure 6:
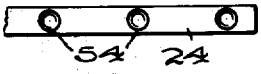
Fig. 6 is a plan view of the lower edge of the cutting tool showing a series of sockets adapted to receive the ball-like member on the upper end of the auxiliary support shown in Fig. 5.
Figure 5:
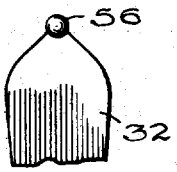
Fig. 5 is a fragmentary side elevation of a modified support in which the upper end has a ball-like member adapted to cooperate with sockets in the lower edge of the cutting tool.

The modified form of Figs. 5 and 6 provides hemispherical sockets 54 in the lower edge of the tool and a ball-like end 56 on the top of the tool support for cooperation therewith whereby relative lateral movement of the parts is prevented.

The assembly of the cutting tool and the auxiliary tool support appear to be obvious and therefore will be described only briefly. Tool 18 is mounted and held in the tool post 16 by means of members 19 and 20. The auxiliary tool support 30 is then positioned between the lower face 24 of the cutting tool 18 and the surface of the cross feed member 3. The upper end 42 of the tool support is placed in the desired groove 26 and the support inclined outwardly therefrom whereupon the adjustable base is rotated so as to lengthen the tool support until it comes in contact with the surface of the cross feed, then by withdrawing the compound slightly the support will be brought into a more vertical position, thus tightening the support and securely positioning the base on the cross feed member so as to prevent springing of the cutting tool and thereby to prevent chattering. After the adjustment and positioning of the support, the feeding of the cutting tool 18 into the work is accomplished through transverse movement of cross feed member 3 through screw 5. The flat sides of the auxiliary tool support should be parallel to the vertical sides of the cutting tool so that the tool support will freely fit into the groove cut by the tool where it is used for parting the work or otherwise deeply indenting it. As shown in Figs. 1 and 2 the upper portion of the tool support 30 has such a width relative to that of the tool 18 that it can follow the tool into a cut.

In cases where the lathe has no compound then the entire adjustment of the auxiliary support is made by varying the length of the support by rotation of the adjustable base.

It should be noted that the tool 18 has a plurality of grooves 26 so that as it is ground back following wear the tool support may still be used and positioned near the cutting end of the tool.

What I claim as novel and desire to secure by Letters Patent is:

1. In a lathe having a carriage with a horizontally and transversely moving cross feed member mounted thereon, and an adjustable compound carried by said cross feed member, and a vertical tool post on the compound adapted to receive and hold a cutting tool: the combination comprising a cutting tool mounted in the tool post and having a plurality of recesses arranged along the lower edge thereof adjacent the cutting end; an auxiliary tool support having an upper portion formed to fit selectively into any of the recesses and having a width that permits it to follow the tool into a cut, and a base member threadedly mounted in the lower end of the upper portion for adjusting the overall length of the tool support, whereby the upper portion fitting into a selected one of the recesses in the tool firmly positions the upper end of the auxiliary support therein when the auxiliary support is inclined from normal to the axis of tool advance, the base member being adjusted so that it seats on the surface of the cross feed member whereby longitudinal movement of the tool will swing the auxiliary support toward the normal to the said tool axis to increase the firmness of supporting action with respect to the tool and thereby prevent springing and consequent chattering of the tool in use.

2. The combination of claim 1 in which the cutting tool has a plurality of transverse grooves arranged along the lower edge thereof adjacent the cutting end, and the auxiliary tool support has a tooth-like upper portion for selectively fitting any of said grooves.

*3. In a lathe having a carriage with horizontally and transversely moving cross feed members mounted thereon, an adjustable compound carried by said cross feed member, and a vertical tool post on the compound adapted to hold a cutting tool: the combination comprising a cutting tool mounted in the tool post and having a plurality of recesses arranged along the lower edge thereof adjacent the cutting end; an auxiliary tool support having an upper portion formed to fit selectively into any of the recesses and a lower portion forming a base member shaped to seat on the cross feed member, said auxiliary support having a width that permits it to follow the tool into the cut, the upper portion of the auxiliary tool support fitting into a selected one of the recesses in the tool firmly positions the upper end of said support therein when the auxiliary support is inclined from normal to the axis of tool advance and the base member is seated on the cross feed member, whereby longitudinal movement of the tool will swing the auxiliary support toward the normal to said tool axis to increase the firmness of supporting action with respect to the tool and thereby prevent springing and consequent chattering of the tool in use.*

*4. In a lathe having a cross feed and a movable tool carried thereon, the combination comprising a cutting tool movably mounted on the cross feed member and having a plurality of recesses arranged along the lower edge thereof, means to longitudinally move said tool relative to the cross feed member, an auxiliary tool support having an upper portion formed to fit selectively into any of the recesses and a lower portion forming a base member shaped to seat on the cross feed member, said auxiliary support having a width that permits it to follow the tool into the cut, whereby the upper portion of the auxiliary tool support fitting into a selected one of the recesses in the tool firmly positions the upper end of said support therein when the auxiliary support is inclined from normal to the axis of tool advance and the base member is seated on the cross feed member, whereby relative longitudinal movement of the tool with respect to the auxiliary support will swing the auxiliary support toward the normal to said tool axis to increase the firmness of supporting action with respect to the tool and thereby prevent springing and chattering of the tool in use.*

References Cited in the file of this patent or the original patent

UNITED STATES PATENTS

| | | |
|---|---|---|
| 517,167 | Pratt | Mar. 27, 1894 |
| 630,778 | Guise | Aug. 8, 1899 |
| 1,036,101 | Hartness | Aug. 20, 1912 |
| 1,134,460 | Kehr | Apr. 6, 1915 |
| 1,187,099 | Rogers | June 13, 1916 |
| 1,636,898 | Bugatti | July 26, 1927 |
| 2,668,467 | Paine | Feb. 9, 1954 |

FOREIGN PATENTS

| | | |
|---|---|---|
| 162,981 | Germany | Apr. 25, 1949 |
| 522,968 | Great Britain | July 2, 1940 |